United States Patent Office 2,979,663
Patented Apr. 11, 1961

2,979,663

MEASURING EQUIPMENT

Joseph Gill, Pittsburgh, and Frederick W. Sippach, Crafton, Pa., assignors to Hagan Chemicals & Controls, Inc., Pittsburgh, Pa., a corporation of Pennsylvania Filed Mar. 10, 1959, Ser. No. 798,490

11 Claims. (Cl. 328—150)

This invention relates to the art of measuring equipment and more particularly to equipment for accurately measuring peaks of an alternating current signal.

As conducive to an understanding of the invention it is noted that many types of equipment require D.C. voltages for their actuation and also that D.C. voltages are generally more easily read to a high degree of accuracy than A.C. voltage. Accordingly it is essential that where a transducer, such as a pressure responsive device, has an A.C. output, that such output be converted to a D.C. value which is directly proportional to the A.C. value with a minimum error.

More particularly it is essential that the peak value of the alternating current output be accurately determined and translated into D.C. value.

Where a vacuum type of rectifier is used with conventional circuitry to convert an alternating current to a direct current, since it conducts even with reverse bias, up to values of one-half to one volt, the output often is not directly proportional to the input so that an accurate indication is not afforded. In addition the effect of conduction with reverse bias is unpredictable due to ageing of the tube, voltage changes and the like.

Where to reduce the effect of conduction with reverse bias, silicon type diodes are used as rectifiers, but with conventional circuits, since the resistance in the forward direction is high until the applied voltage exceeds say one-half volt, the output would also not be directly proportional to the peak value of the alternating current input. Furthermore the point of conduction is a variable depending upon the particular diode used and the temperature and age thereof.

Regardless of the type of rectifier used, where capacitors and resistors or chokes are used in a filter network, to provided substantially pure D.C., there must be a large time allowed to permit charging of the capacitor by a large number of cycles of the input in order to insure effective filtering action. This raises numerous problems.

Thus if the measurement of the resultant D.C. must be made in a short period of time due to the requirements of subsequent circuits that are fed, then either filtering must be sacrificed which prevents accurate operation of subsequent circuits or the output will be less than the peak value of the input which also is undersirable.

It is accordingly among the objects of the invention to provide a measuring equipment that is dependable in operation and is not likely to become deranged even after long continuous use, that will provide a D.C. output that is directly proportional to a peak of an alternating current input with an extremely small error, which will provide effective filtering action in a relatively short space of time even for a low frequency output from a transducer, and the output of which is substantially unaffected by the load applied thereto.

According to the invention, these objects are accomplished by the arrangement and combination of elements hereinafter described and particularly recited in the claims.

In the accompanying drawings in which are shown one or more of various possible embodiments of the several features of the invention, Fig. 1 is a circuit diagram of the equipment;

Figure 1:
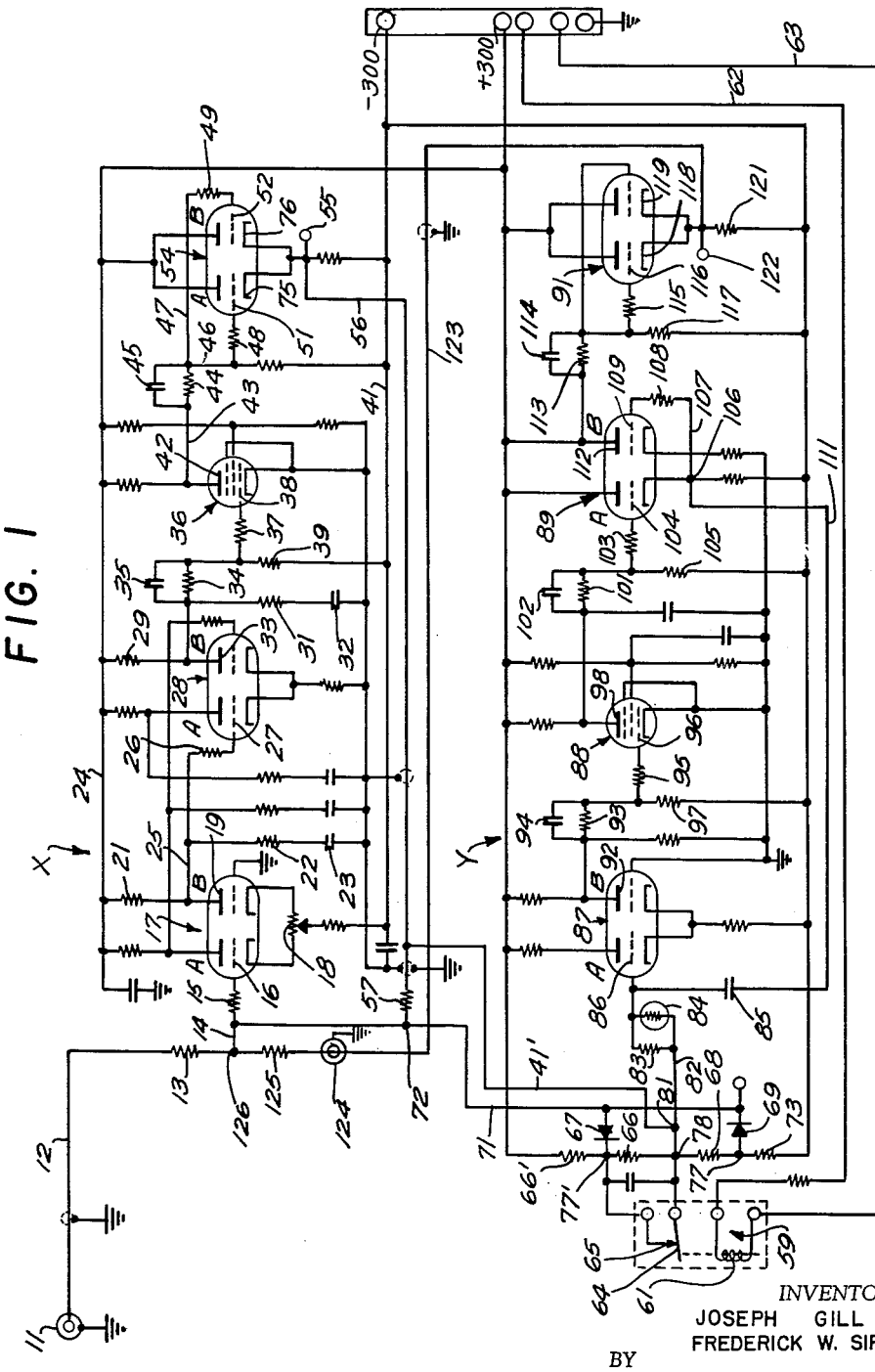

Referring now to the drawings, the output from an A.C. amplifier (not shown) which is fed by a suitable A.C. transducer, such as a pressure responsive device, is applied to input terminal 11, where it appears as a sine wave.

Such signal is fed through lead 12, resistor 13, lead 14, through parasitic suppressor resistor 15 to the control grid 16 of section A of differential amplifier 17. The amplifier 17 has a zero adjust resistor 18 in its cathode circuit which is set so that when there is no input signal to control grid 16 there will be no output signal.

When there is an input signal, the amplified output signal from plate 19, which is developed across the load resistors 21, 22 and capacitor 23 connected between lead 24 (+300 volts) and ground, is fed in the same phase as the input through lead 25 and resistor 26 to control grid 27 of section A of differential amplifier 28.

The amplifier again amplifies the signal and such signal which is developed across load resistors 29, 31 and capacitor 32 is fed in the same phase from plate 33 of section B of amplifier 28, through parallel connected resistor 34 and capacitor 35 (the latter compensating for stray capacitance appearing at the grid 38 of amplifier 36), through resistor 37 to the control grid 38 of said amplifier 36, said grid 38 being connected through resistor 39 to lead 41 connected to −300 volts to bias the amplifier 36.

The amplified signal from the plate 42 of amplifier 36, which is now of reversed phase, is fed through lead 43, parallel connected resistor 44 and capacitor 45, leads 46, 47, resistors 48, 49 to the control grids 51, 52 of sections A and B of cathode follower 54, the dual input to the cathode follower providing added power output.

The signal appearing at the output 55 of the cathode follower 54, which has been amplified by the stable high gain amplifier network X including amplifiers 17, 28, 36 and 54, is fed through lead 56, feed back resistor 57 and resistor 15 back to control grid 16 of amplifier 17.

When the system is operating, the relay 59 is energized, a source of potential being applied to the coil 61 of the relay through leads 62 and 63. The contact arm 64 of energized relay 59 will engage fixed contact 65 to short circuit resistor 66 and place diode 67 in parallel with resistor 57, the impedance of said diode varying inversely with the current flow therethrough.

Thus as the input signal from the transducer, whose output is connected to terminal 11 varies, the impedance of diode 67 will vary inversely, i.e. as the input signal increases, the impedance of the diode 67 will decrease. Thus since diode 67 is in parallel with resistor 57, the greater the input signal, the less will be the parallel resistance of diode 67 and resistor 57. In other words, as the value of the input signal increases, the gain of the network X will decrease.

Since diode 67 has a threshold at which it starts to conduct, which is in the order of say one-half volt, as soon as the input to terminal 11 in a positive direction, which is amplified by network X, results in an output from such network in excess of −½ volt, due to the effect of diode 67 on feed back resistor 57, the gain of amplifier network X would be reduced to hold the output of amplifier network X at terminal 55 to approximately −½ volt.

This is what occurs when the input signal goes in a positive direction. When the input signal is in a negative direction, i.e., the output at terminal 55 is in a positive direction, the dode 67 will not conduct and the path for current will be through leads 56 and 41; junctions 81 and 78, resistor 68, diode 69, lead 71 to junction 72.

It is noted that resistors 68 and 73 which illustratively have values of 20K and 100K respectively, are connected between −300 volts and terminal 55 (the cathodes 75, 76 of cathode follower 54). Thus they form a voltage divider.

Assuming that there is an input to amplifier network X sufficient to provide an output at terminal 55 of say +50 volts, there will now be 350 volts across the divider and hence 2.92 ma. will flow. Consequently the IR drop across resistor 63 will provide −8.4 volts at junction 77. As a result diode 69 will not conduct. When the input signal causes the voltage at terminal 55 to reach approximately 60 volts then there will be 3 ma. flowing and the voltage at junction 77 will be zero. Since diode 69 has a threshold of approximately ½ volt, the voltage at terminal 55 must be approximately 60.6 volts to provide ½ volt at terminal 77 for diode 69 to conduct. At this time the gain of amplifier network X would be reduced to hold the output of amplifier network X at terminal 55 to approximately 60.6 volts.

Thus with the system above described when the input signal to terminal 11 is positive and sufficient to provide at least −½ volt at terminal 55, the diode 67 will start to conduct and as soon as the input is negative and sufficient to provide +60.6 volts at terminal 55 the diode 69 will start to conduct, in both cases to control the gain of amplifier network X.

If the input signal in either of these directions is less than required to provide −½ volt and +60.6 volts as above set forth, the diodes 67 and 69 respectively will have no effect and the system will function with the gain of amplifier network X unaffected by the diodes.

At junction 81 in the illustrative embodiment shown there would thus appear a negative and positive signal and since the diodes control the gain of amplifier network X, as above described, where the peaks of the input signal when amplified by network X are sufficient to provide a positive and negative output at terminal 55 greater than 60.6 and less than −½ volt, respectively, since most of the signal will be positive, it is essentially pulsating D.C. of positive polarity which is fed through the filter network comprising parallel connected resistor 83 and "Thyrite" 84, and capacitor 85.

The signal is thus made into a smooth D.C. by the filter network and fed to the control grid 86 of section A of differential amplifier 87 which is the first stage of the high gain D.C. amplifier network Y comprising amplifiers 87, 88, 89 and 91.

The output from plate 92 of amplifier 87, which is in the same sense as the input, is fed through parallel resistor 93 and capacitor 94 (the latter serving to compensate for stray capacitance), and through parasitic suppressor resistor 95 to the control grid 96 of amplifier 88, the resistors 93 and 97 forming a voltage divider to bias amplifier 88.

From the plate 98 of amplifier 88, the signal is fed in reverse phase, i.e. a negative signal, through parallel resistor 101 and capacitor 102 (the latter compensating for stray capacitance) through parasitic suppressor resistor 103 to the control grid 104 of the section A of amplifier 89 which defines a cathode follower, resistors 101 and 105 serving as a voltage divider to bias the cathode follower 89.

From the junction 106 of the cathode follower 89, the negative D.C. is fed through lead 107, parasitic suppressor resistor 108 to control grid 109 of section B of amplifier 89. In addition junction 106 is connected through lead 111 to one side of filter capacitor 85, the other side of which is connected to grid 86 of amplifier 87.

From the plate 112 of section B of amplifier 89, the D.C. signal in a reverse sense, i.e. positive D.C., is fed through parallel resistor 113 and capacitor 114 (the latter compensating for stray capacitance) parasitic suppressor resistor 115, to the control grid 116 of cathode follower 91, resistors 113 and 117 forming a voltage divider to bias the cathode follower 91.

The cathodes 118 and 119 of cathode follower 91 are connected through resistor 121 to −300 volts to establish the operating current. The output of the cathode follower which is filtered positive D.C. appears at terminal 122.

This terminal 122 is connected by lead 123 to output terminal 124 and to one end of summing resistor 125, the other end of which is connected to junction 126 to which the input from terminal 11 is connected.

Thus at junction 126 we have the A.C. input from the transducer, the D.C. output from amplifier network Y and the error signal from the feed back loop of amplifier network X.

To facilitate an understanding of the operation, of the equipment, in the transient condition, prior to the final steady state condition, it is assumed that the D.C. output from network Y is +10 volts due to the negative portion of the input signal.

At this time assuming that the output at terminal 55 is +60.6 volts, the diode 69 will conduct and due to its effect on feed back resistor 57, will limit the gain of network X and maintain its output at 60.6 volts.

Substantially instantaneously the capacitor 85 will have charged some small fraction of 60.6 volts as the output of network Y as above set forth is asumed to be +10 volts and there is the high gain of this network Y following capacitor 85.

Figure 2:
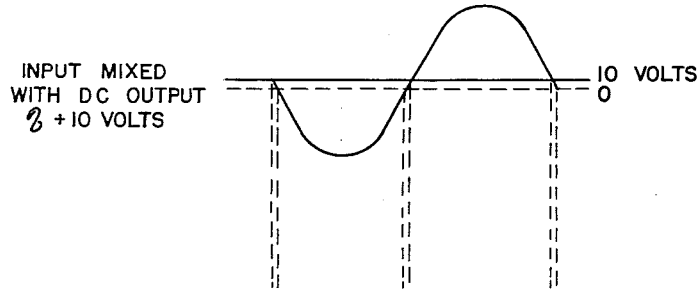
Fig. 2 is a wave pattern of a typical input signal.

Since the D.C. output of +10 volts is mixed with the input signal it will cause the positive portion of the input to increase and the negative to decrease as shown in Fig. 2.

As the value of the negative portion of the input signal increases in magnitude to its maximum, and assuming that the capacitor 85 charges at a rapid rate, it will quickly have a charge sufficient to provide a D.C. output from network Y slightly less than 50 volts.

The positive portion of the input signal will result in −½ volt at junction 81 due to the action of diode 67 on resistor 57 that reduces the gain of network X.

Figure 4:
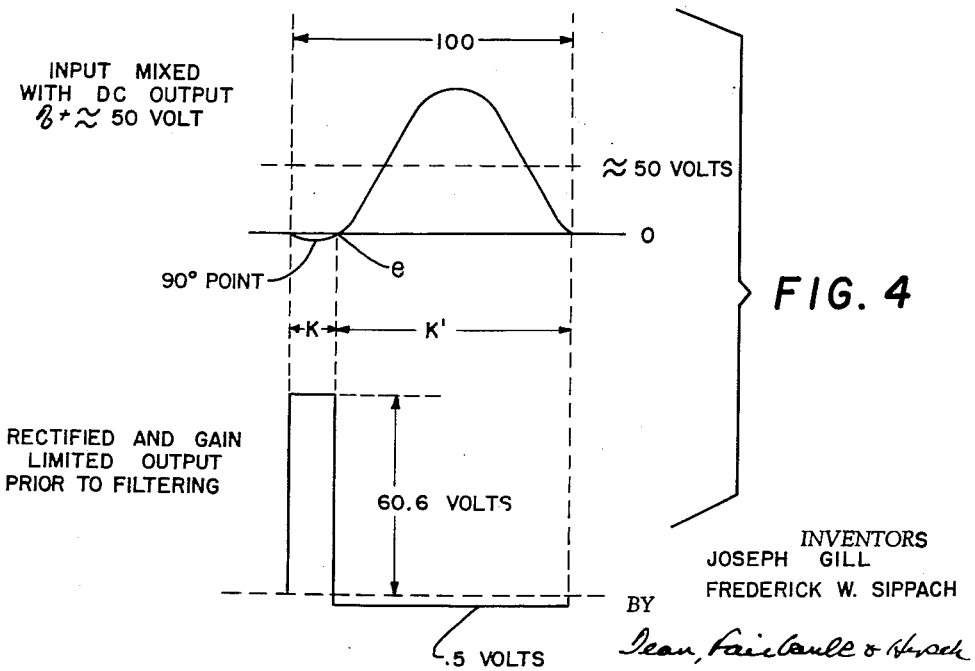
Fig. 4 is a wave pattern illustrating the limiting and rectification action of the system as the D.C. output approaches the value of the input peak value.

Referring to K and K' in Fig. 4 it is apparent that since the period of the positive portion of the input has been increased by the shifting of the base line due to the mixing of the approximately +50 volt D.C. output with the input, the period of the negative portion of the input has been decreased. Accordingly the positive peak at terminal 55 will be narrower in width.

The D.C. output of network Y cannot exceed +50 volts in the illustrative embodiment for if it did, since it is mixed with the input signal which has negative and positive peaks of 50 volts, there could be no net negative input signal to be amplified by network X and hence the signal at terminal 55 would be all negative (resulting from the positive input to terminal 11) so that when filtered there would be no +D.C. and hence capacitor 85 would discharge and the D.C. output from network Y would drop below 50 volts so that the system would recycle.

Actually the D.C. output approaches but never reaches 50 volts, for as the width of the positive spikes at terminal 55 became narrower with increase in the D.C. output from network Y, toward 50 volts, the average value of the rectified positive peaks would become less and less and the peak must be of sufficient width to produce a net positive voltage in the presence of negative D.C. of −½ volt (due to the positive portion of the input signal) which now exists for substantially the entire cycle.

Thus referring to Fig. 4:

$$60.6K = (100-K)\tfrac{1}{2}$$

$$60.6K = 50 - .5K$$

$$K = \frac{50}{61.1} = .817 \text{ or approximately } .82$$

where:

K=width of maximum positive rectified peak
60.6=value of maximum positive peak
.5=value of maximum negative rectified peak
100=full cycle Thus there is zero D.C. when K=.82 percent of the cycle. If K is say .83 percent of the cycle there is a positive D.C. output.

Hence the minimum width of spike of 60.6 volts must be equal to .83 percent of the cycle so that when filtered and averaged with —D.C. of ½ volt lasting 99.17 percent of the cycle, there will be a positive D.C. sufficient to provide the full output.

Since .83 percent of 360 degrees is 2.988 by the formula $e_{inst.} = e_{max} \sin \theta$ as $e$ (Fig. 4) is displaced from the 90 degree point ½ of 2.988 then $$e_{inst.} = e_{max} \sin 90 - 1.494$$
$$e_{inst.} = 50 \sin 88.506$$
$$e_{inst.} = 50 \times .9997$$
$$e_{inst.} = 49.985$$

Thus with the peak of 50 volts, the output D.C. voltage is approximately 49.985, an error of .015 volt or .03% and with conventional rectifiers the error is approximately 1 to 2% or ½ to 1 volt.

It is important to have good filtering of the D.C. so that there are no fluctuations in the output which would cause an error in the equipment being fed. However, if sufficient filtering is introduced to provide pure D.C., the response time of the system might be too slow, i.e. the rate at which the output D.C. reaches its peak value would be too slow (with a resistor of 10 megohms and a capacitor of .33 microfarad the time constant will be 3.3 seconds).

By reason of the "Thyrite" 84 the circuit provides rapid response to variation in the input signal yet with good filtering action.

Figure 3:
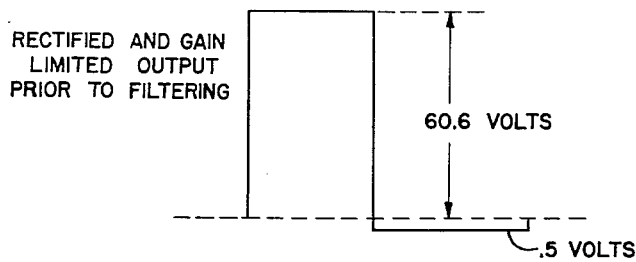
Fig. 3 is a wave pattern illustrating the limiting and rectification action of the equipment.

Thus since a "Thyrite" has a low resistance with a high voltage applied thereto and since initially the positive D.C. voltage to be filtered is relatively large and of long duration (Fig. 3) the "Thyrite" would have a low resistance, say 2K, which is in parallel with 10 megohms so that the parallel resistance is approximately 2K. Hence the time constant of the filter would be $$.33 \; \mu f. \times 2K = .00066 \text{ second}$$

Thus initially the time constant would be low, so filtering would be poor. Consequently the capacitor 85 would charge rapidly to permit the D.C. output to follow the negative portion of the input. However as the input to terminal 11 rises, the area of the positive D.C. would get smaller and smaller (Fig. 4), and since the amplitude of the negative rectified D.C. is small i.e. —½ volt, the voltage across the "Thyrite" becomes small, with resultant large increase in its resistance so that effective filtering action is produced and this filtering is present when required, i.e. when the system has stabilized so that the D.C. output will be approximately equal to the negative peaks of the input.

Thus the equipment to be fed will operate on substantially pure D.C. and of value substantially equal to the negative peak of the input signal.

It is to be noted that at junction 81 when the magnitude of the negative portion of the input signal starts to increase, the positive signal at the plate 92 of amplifier 87 also rises. Consequently the voltage at junction 106 of amplifier 89 starts to fall. This falling potential reduces the potential on one side of capacitor 85, making capacitor 85 appear as a large capacitor so that the voltage on the grid 86 of amplifier 87 will rise slowly.

Since the gain of amplifier network Y following capacitor 85 is high, the total output is rising at a high rate which is related to the gain of the amplifier network and the rise at the input 11.

Since a large capacitor is expensive and subject to leakage, it must be of the electrolytic type to avoid ripple. In this case good filtering is accomplished with a relatively small capacitor.

As the cathode follower 91 has a low internal impedance, the load at output terminal 124 does not materially affect the output. Any amount that it is affected will reduce the feed back which results in a large error signal that tends to restore the output.

If the input signal should disappear then the output would persist unless capacitor 85 discharged. However since the capacitor 85 and resistors 83, 84, have a large time constant, the capacitor would remain charged for a long period which is not desired when the peak voltage from another transducer is to be measured.

To this end the relay 59 is deenergized by any suitable means such as a programmer for example. This would open contacts 64, 65 and place resistor 66 into circuit to provide a voltage divider with resistor 66'.

Since there is no input signal and since the capacitor 85 still has a charge sufficient to provide a D.C. output from network Y of +49.985 volts, such voltage will be fed to the input of network X. The negative output of network X at terminal 55 will rise until it reaches a value sufficient to permit diode 67 to conduct to reduce the gain of network X by reason of its effect on resistor 57. Since resistors 66 and 66' have values of 20K and 100K ohms respectively and are connected between +300 volts and terminal 55, when the voltage at terminal 55 rises to —60.6 volts, the current flow through resistors 66 and 66' will be 3.005 ma. so that the IR drop across resistor 66 will be 60.1 volts. Thus the voltage at junction 77' will be —½ volt to permit conduction of the diode but only when the voltage at terminal 55 has reached —60.6 volts.

If not for the addition of resistor 66, the diode 67 would conduct as soon as the voltage at terminal 55 was —½ volt. Thus there would be —½ volt on one side of "Thyrite" 84 and a small positive potential on the other side due to the charge on capacitor 85. This would not be sufficient to reduce the "Thyrite" resistance sufficiently to effect rapid discharge of capacitor 85.

However with the addition of resistor 66 at junction 81 there is now —60.6 volts which is on one side of the "Thyrite" 84. The other side of "Thyrite" 84 has a small positive voltage due to the charge on capacitor 85 so that there is a relatively large voltage across the "Thyrite" 84. Thus its resistance becomes very low and capacitor 85 will discharge rapidly. This quickly reduces the D.C. output from network Y to zero quickly to ready the equipment for the next measuring cycle.

The circuit above described will provide a D.C. output that is substantially equal to the negative peak of the input signal and will operate rapidly and without any affect on its output due to a load applied thereto.

It is of course to be understood that the system may readily be modified to measure the positive peaks of the input signals and the claims are intended to cover such application.

As changes could be made in the above construction, and different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment for determining the peak value of one of the polarity peaks of an A.C. signal which is symmetrical above and below a zero axis, comprising an amplifier, means to feed the signal to the input of the amplifier, said amplifier having an output, means connected to the input of said amplifier and fed by the output of said amplifier to limit the gain of the amplifier for either polarity peak of the input signal, the gain being limited to a lesser extent for the peak whose value is to be determined, thereby to rectify the output of said amplifier, means to filter the rectified output of the amplifier, a second amplifier fed by the output of said filter and having a D.C. output whose polarity is opposite to the polarity of the peak signal whose value is being determined, and means to feed the D.C. output of the second amplifier to the first amplifier to mix with the input signal thereto, whereby the algebraic sum of the value of the D.C output and the value of the input peak whose value is being determined approach a minimum, so that the value of the D.C. output of said second amplifier will become substantially equal to said one of the peaks of the A.C. signal.

2. The combination set forth in claim 1 in which the filter comprises a resistor having a relatively high ohmic value and a capacitor and a voltage responsive resistor connected in parallel with said filter resistor, the resistance of said voltage responsive resistor being inversely proportional to the voltage applied thereto.

3. The combination set forth in claim 1 in which said second amplifier includes a cathode follower, said filter includes a capacitor having one side connected to the input of said first amplifier and means to feed a signal from the cathode follower to the other side of said capacitor in reverse phase to the signal applied to the first side of said capacitor.

4. The combination set forth in claim 1 in which said second amplifier has a cathode follower in its output stage.

5. The combination set forth in claim 1 in which the means to limit the gain of the first amplifier comprises two substantially uni-directional conductive devices each connected between the output and input of the first amplifier and adapted to conduct in relation to the negative and positive portions respectively of the output of the first amplifier, one of said devices being biased to conduct at a higher voltage than the other.

6. The combination set forth in claim 5 in which said conductive devices are rectifiers.

7. The combination set forth in claim 1 in which a feed back loop is provided from the output of the first amplifier to the input thereof, a voltage divider determining the gain of the first amplifier, said voltage divider including a resistor in the feed back loop, said means to limit the gain of the amplifier, varying the effective value of said feed back resistor.

8. The combination set forth in claim 7 in which the means to vary the effective value of the feed back resistor and to rectify the output of the first amplifier comprises a pair of diodes connected in parallel with said feed back resistor, one adapted to pass negative signals and the other positive signals, and means to bias one of said diodes to render it inoperative to pass a signal until such signal is of value greater than the value at which the other diode will pass a signal.

9. The combination set forth in claim 7 in which the means to vary the effective value of the feed back resistor comprises two substantially uni-directional conductive devices in parallel with said feed back resistor and adpated to conduct in relation to negative and positive portions respectively of the output of the first amplifier, a pair of resistors, each connected at one end to the input of said filter and at their other ends to one side of said conductive devices respectively, the other sides of said conductive devices being connected to the input of said first amplifier, a second pair of resistors, each connected at one end to the first side of said conductive devices and their other ends to sources of potential of opposite polarity and switch means normally to short circuit one of the resistors of said second pair, whereby one of said conductive devices will be biased to conduct at a higher voltage than the other.

10. The combination set forth in claim 7 in which in addition to said feed back resistor, said voltage divider comprises an input resistor to one side of which the input signal is fed, the other side of said resistor being electrically connected to the input of said first amplifier and to one side of said feed back resistor, the other side of said feed back resistor being connected to the output of said first amplifier.

11. The combination set forth in claim 10 in which a summing resistor is provided having one end connected to the output of the second amplifier and its other end connected to the junction between said input resistor and said feed back resistor.

References Cited in the file of this patent
UNITED STATES PATENTS

| | | |
|---|---|---|
| 2,708,736 | Creveling et al. | May 17, 1955 |
| 2,895,105 | Sontheimer | July 14, 1959 |